April 24, 1956 F. H. OWENS 2,742,835
CAMERA TAKE-UP AND SHUTTER AND INTERLOCK THEREBETWEEN
Filed Dec. 17, 1952 9 Sheets-Sheet 1

Inventor
Freeman H. Owens
By
Attorney

April 24, 1956   F. H. OWENS   2,742,835
CAMERA TAKE-UP AND SHUTTER AND INTERLOCK THEREBETWEEN
Filed Dec. 17, 1952   9 Sheets-Sheet 3
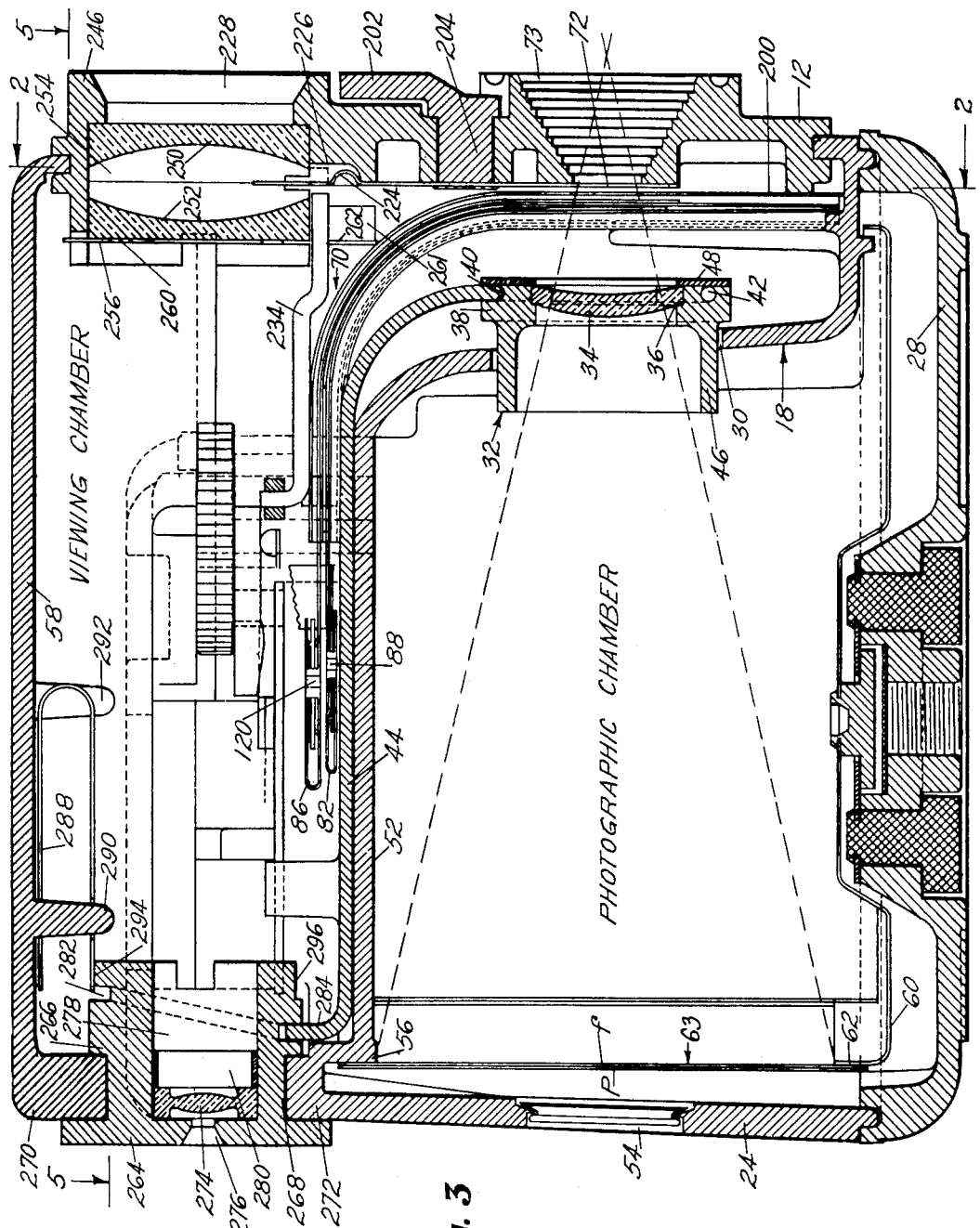
Fig. 3
Inventor
Freeman H. Owens
Attorney

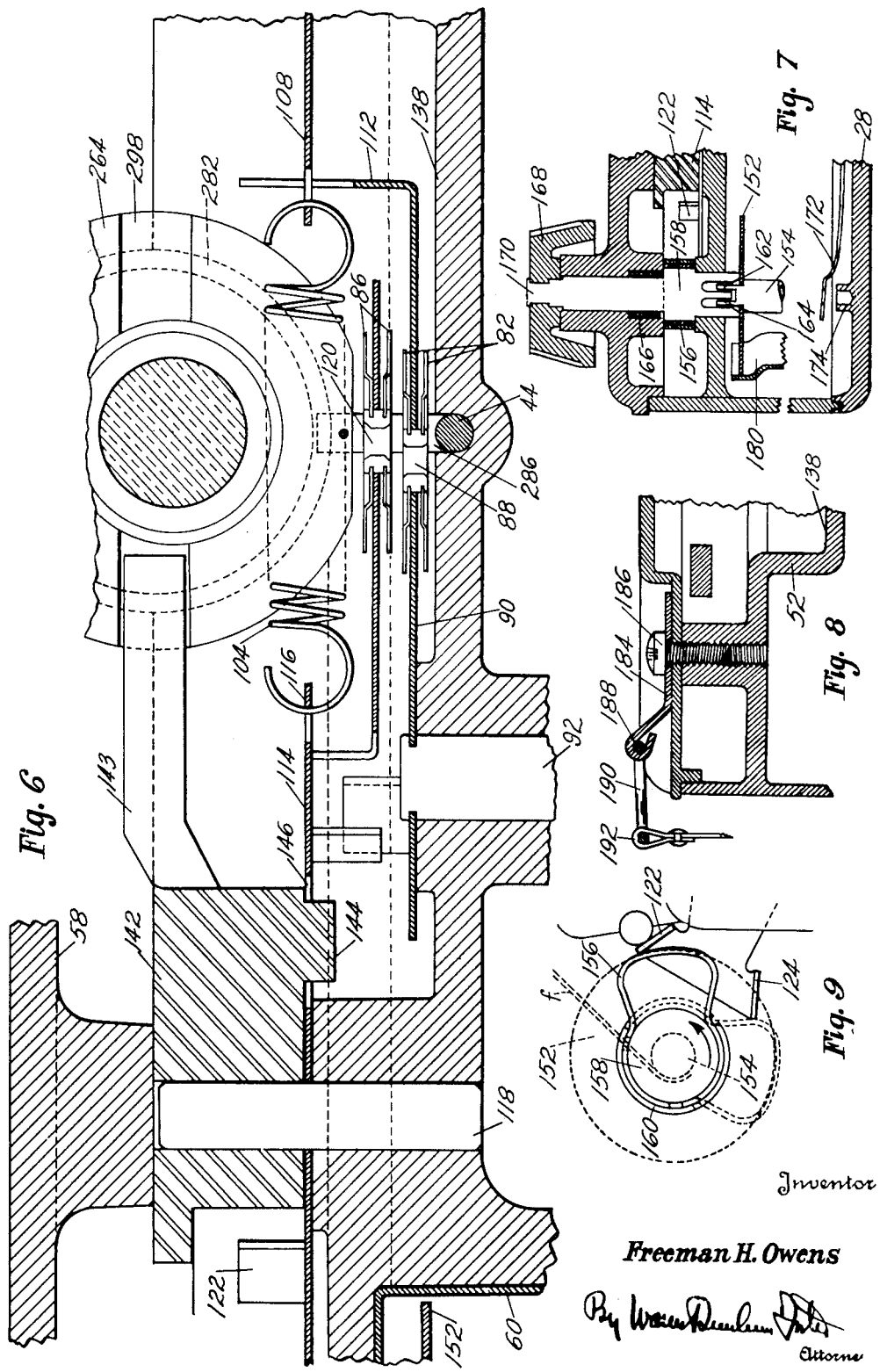

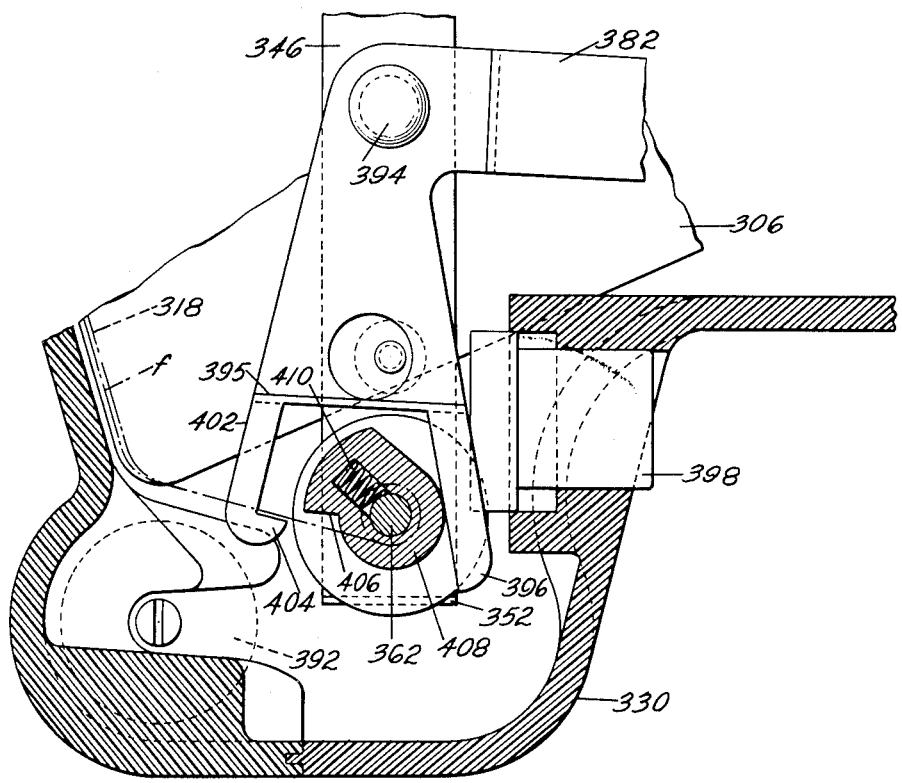
Fig.16
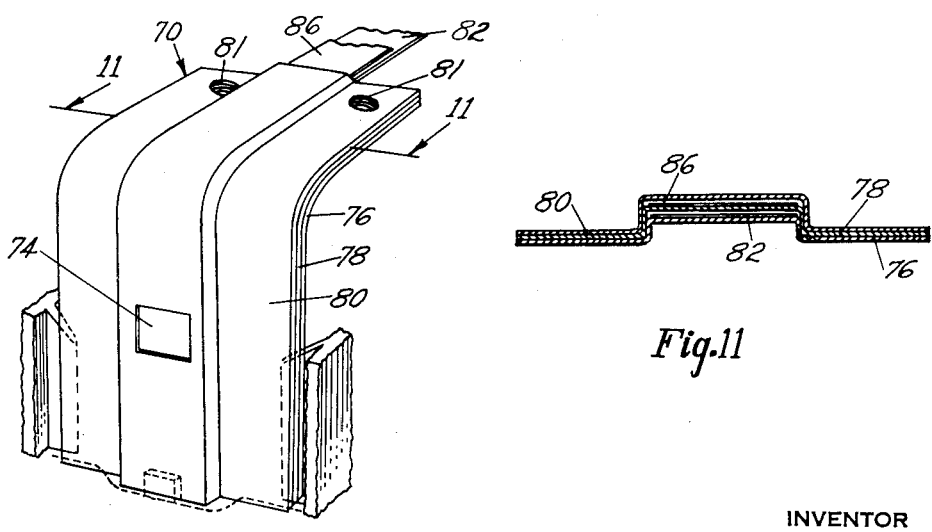
Fig.10
Fig.11
INVENTOR
FREEMAN H. OWENS
BY
ATTORNEY

April 24, 1956   F. H. OWENS   2,742,835
CAMERA TAKE-UP AND SHUTTER AND INTERLOCK THEREBETWEEN
Filed Dec. 17, 1952   9 Sheets-Sheet 8

Inventor
FREEMAN H. OWENS
By
Attorney ns # United States Patent Office 2,742,835
Patented Apr. 24, 1956

2,742,835

CAMERA TAKE-UP AND SHUTTER AND INTERLOCK THEREBETWEEN

Freeman H. Owens, New York, N. Y.

Application December 17, 1952, Serial No. 326,417

22 Claims. (Cl. 95—31)

This invention relates to a camera. Operations of a shutter and a take-up are interlocked so that the winding up of a film after exposure tensions the shutter and renders it again operable to prevent a second exposure upon a portion of a film upon which an exposure has already been made. For many years elaborate and expensive devices to this end have been proposed and many placed in use. A primary purpose of this invention is to provide a common control for a shutter and take-up which is simple and easy to make and operate and very inexpensive. So far as known my devices whereby a shutter is necessarily re-set by the winding up of a film so that a fresh exposure area or "frame" is automatically advanced is the first in this art which is so lacking in complication and cheap that it is adapted for installation within amateur cameras of almost the cheapest grade. Yet it is so certain in its operation that it is equally applicable to the finest photographic instruments. Devices to prevent double exposure which have been previously known to me are complicated mechanisms generally controlled by measuring rolls which actuate mechanism which locks and unlocks a shutter. They include clutching and de-clutching connections between a shutter re-setting mechanism and a take-up roll, with triggers and releasing mechanisms, gear segments, racks and the like. I avoid all such complicated mechanisms. In certain embodiments for carrying out my invention I merely elongate one shutter re-setting lever, supply it with motion-receiving formations and operate it by a motion-transmitting resiliently mounted cam movable directly by the take-up. My construction therefore involves only two or three parts additional to those employed for the shutter and take-up alone, with an added cost which is measurable in a few mills. To save complication I do not necessarily wind up an entire frame before the shutter is re-set but rely upon a user to continue winding if necessary until the usual number appears before a protective window in the back of the camera. All that a user need to remember is that a number—any number—must appear before the window.

A very important object of this invention therefore is to bring the advantages of fool-proof operation of a camera to amateur photographers, particularly by those whose budgets are limited and to give them within their means the advantages which are now reserved for enthusiasts who can spend very many times the amount at which cameras embodying my invention cost. I wish particularly to emphasize that these phases of my invention may be employed in high-priced cameras which in other respects are conventionally complicated.

A related object of this invention is to provide camera mechanism and structure which are particularly adapted for use with these devices for preventing double exposure. Included within this object are shutters and shutter-control mechanisms which are in themselves simple and lend themselves with peculiar ease and effectiveness to use in this combination.

Another object is to interlock the above outlined joint control of take-up and shutter with devices which control the movement of a lens to focus the camera, an iris plate to change the amount of light reaching the camera and a finder system.

This application is a continuation-in-part of my co-pending application Serial Number 642,761, filed January 22, 1946, and upon December 23, 1952 patented as Number 2,662,496 and of application Serial Number 326,419 filed December 17, 1952, which also is a continuation-in-part of my said first mentioned application Serial Number 642,761. Attention is also drawn to my co-pending application, Serial Number 326,418, filed December 17, 1952, which is a division of my said parent application now Patent Number 2,622,496 dated December 23, 1952.

The objects of my invention will be understood from the general statement above as well as from the specific description which follows. Other objects, characteristics and advantages of my invention will be clear from the following portion of this specification, generalized discussion which has preceded, the attached drawings and the subjoined claims. While for purposes of illustration I am showing preferred forms only of my invention it will be readily understood that changes may be made therein without departing from the spirit of my invention or the scope of my broader claims.

In the drawings:

Figure 3 is a vertical section taken on the line 3—3 of Figure 1.

Figure 4 shows the camera in position for an exposure to be made.

Figure 6 is an enlarged fragmentary section taken on the line 6—6 of Figure 5, but showing the shutter-parts in the position of Figure 4.

Figure 7 is a fragmentary vertical sectional view showing one of my take-up devices and taken on the line 7—7 of Figure 5.

Figure 8 is a fragmentary section showing one corner of a control chamber.

Figure 9 is a fragmentary view corresponding to a leftward portion of Figure 5 but showing my shutter setting device as having moved the exposure control mechanism to a position with the shutter reset ready to take a picture.

Figure 10 (Sheet nine) is an enlarged fragmentary perspective view illustrating my flexible shutter blades and the guideways therefor.

Figure 11 is a section taken on the line 11—11 of Figure 10.

Figure 16 is an enlarged fragmentary horizontal section corresponding in part to the lower portion of Figure 14, showing the interlocking connection between a shutter operating means and a take-up device.

Figure 1:
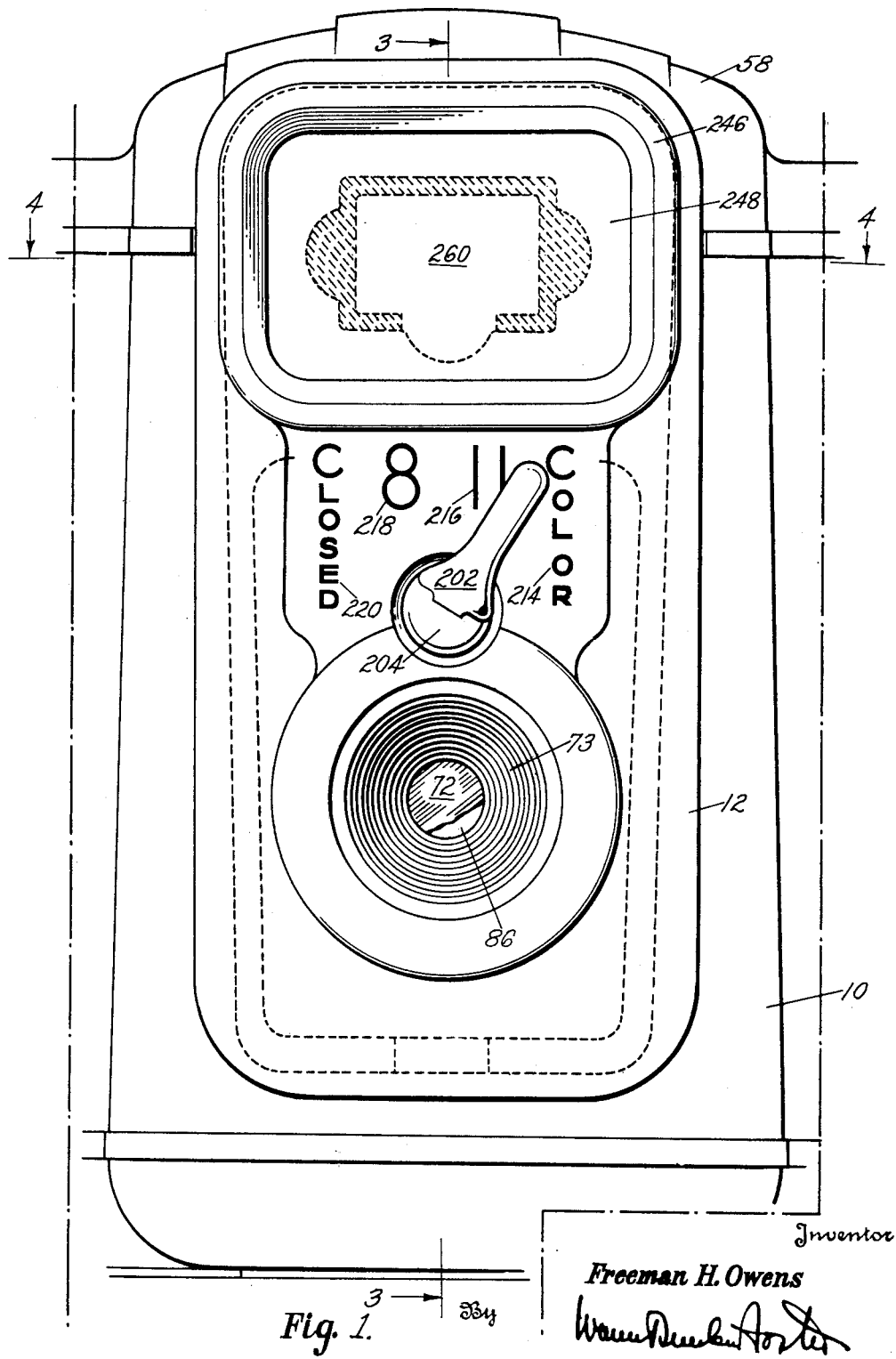
Figure 1 is a front elevational view of a central portion of one of my cameras with which I practice this invention, certain parts being omitted for clarity.

In this specification and in the appended claims the words "right" and "left" are from the point of view of a user who holds my camera to take a picture, except as stated to be from the point of view of the drawings. In figures taken from the front, the right and left positions are reversed from those of a user. The words "upper" and "lower," "forward" and "back," "front" and "rear" and "vertical" and "horizontal" are similarly used, always with the camera held in usual operative position, with the finder system at its top. Like words and derivatives are similarly used.

The housings of both of my cameras by which I illustrate the invention claimed herein are characterized by outer casings T-shaped in top plan and with cooperating pairs of protuberances in each end of the cross bar of the T and a lens aligned with the bottom of the leg of the T. In the first described herein for purposes of illustration a front wall 10 has an opening wherein a view finder panel or front plate 12 is supported. In the embodiment of my invention first presented herein side walls 14 and 16 are integral with this front wall 10 and with my novel multi-purposed plate 18 later described, and generally parallel to the optical axis of the instrument. These side walls and the back wall include paired protuberances P1 and P2 formed in one end of the cross bar of the T outside of re-entrant curve 20 and P3 and P4 formed in the other end of the cross bar outside of re-entrant curve 22. These protuberances are of such size and shape that those of each pair can readily be firmly grasped. All these walls, including back wall 24, are integral with my multi-purposed plate 18. A shutter control button 26 projecting forwardly through re-entrant curve 22 may readily be pressed by one finger of a right hand of a photographer, the other fingers and palm of this hand then grasping the camera, this button being movable parallel to the optical axis of the camera. As best seen in Figure 3, this irregularly shaped interior-exterior multi-purposed wall or plate 18 extends first backwardly, parallel to bottom wall 28, and thence upwardly to define an opening 30 which receives a mount 32 for a lens 34. A central opening through this mount has a shoulder 36 against which the lens rests. A forward flange 38 contains an annular slot 40 open at its forward end for receiving a forward ring-shaped end 42 of a focusing control rod 44 later described. A rearward flange 46 supports the mount for movement in opening 30. The lens 34, placed against shoulder 36, and the control rod are held in place by a retainer plate or clamp 48 which by resilient flanges or wings 50 is snapped onto the lens mount, without use of tools.

This interior portion of this multi-purposed plate 18 thence extends rearwardly as an inner top or intermediate wall 52 forming a partition between a photographic or dark chamber and a viewing chamber. Thence it extends both upwardly and downwardly to form rear wall 24 having a sight opening 54 with a protective filter through which numerals are visible upon paper backing of a film indicating the number of a "frame" then in exposure position. This plate also continues forwardly to form side walls 14 and 16 as stated above. At its front and rear this plate is joined to bottom wall 28 by a dove tail. A backwardly facing guide 56 adjacent and forwardly of the junction of the top and rear portions engages the upper margin of the film and forms the upper edge of a film exposure aperture.

Thus it will be seen that this single plate 18 accomplishes many results. It ties my entire structure together, including the front panel 12 and bottom wall 28, together with the focussing and sighting mechanism later described, and a top wall 56. Top wall 56, as clearly shown in Figure 3, bridges the space between front panel or wall 12 and back wall portion 24 of multi-purposed plate 18. Perhaps even more important this plate serves as a central vertical partition bounding the forward end of a photographic or dark chamber and supporting the lens and also as a common wall for the top of this photographic chamber and the bottom of my viewing chamber which supports the shutter and lens and take-up control mechanism. The particular structural characteristics and results of this multi-purposed wall are reflected in the planes of my parent application Serial Number 326,419, filed December 17, 1952.

An irregularly formed integral bottom and multiple side interior plate 60 includes a rearward and upwardly facing film guide 62 corresponding to film guide 56 and forming the lower boundary of an exposure aperture or gate 63 for the film $f$. Plate 60 also includes means for the reception of devices for locking the bottom plate to the remainder of the camera, as described in my co-pending application Serial Number 326,419, filed December 17, 1952.

Now that I have briefly presented the basic structure of one of my cameras which supports the shutter and the take-up and mechanism closely related thereto I shall describe a first of my shutter devices and explain its inter-relation with my take-up.

A curved fixed shutter guideway generally indicated as 70 in form roughly resembling an inverted letter J as seen in Figure 3 extends between lens 34 and opening 72 in the front wall upwardly and then backwardly along the front portion of the top wall of the photographic chamber. It is provided with an exposure opening 74 in alignment with the lens and its front opening. This guideway consists of three parallel guiding surfaces, as will best be seen in Figures 10 and 11, an inner or lower surface or wall 76, a middle surface or central partition 78 and an outer or upper surface or wall 80, each having a supporting flange at each side. Openings 81 (Figure 10) receive pins 238 which position this multiple guideway.

An exposure shutter 82 with an exposure opening 84 (Figure 2) is disposed for longitudinal movement between lower wall 76 and central partition 78 of the guideway. This shutter is in the form of a thin leaf spring so that it follows the curvature of its guideway. A cover-up shutter 86 similarly constructed is disposed between center partition 78 and upper partition 80 in the guideway. When the shutter has been re-set and is ready for an exposure opaque portions of both blades are before the lens. As these resilient shutter plates by mechanism later described are pulled to exposure position the cover-up blade 86 is first pulled into position above and clear of the lens. Then aperture 84 of exposure blade 82 is pulled rapidly over the lens to make the exposure. Before the exposure shutter is re-set (by the pushing of the exposure blade back to its original position) the cover-up shutter has been automatically advanced (pushed) to a position covering the lens so that the film is not exposed during re-setting when the exposure aperture passes the lens. Such timing per se is common in conventional pivoted shutters. The photographically operative movement of my elements is entirely in a vertical plane and in vertical directions as the film is held in normal picture taking position. This plane is parallel to that of the film and one normal to the principal optical axis of the lens. There is no pivotal movement. As will later appear, only one tensioned spring applies force to the shutter to make an exposure in comparison to the two (or more) in conventional shutters. I show these shutter blades as of one piece but each may be made of two elements, one light obscuring and one a flexible connector between it and the operating mechanism later described.

Figure 4:
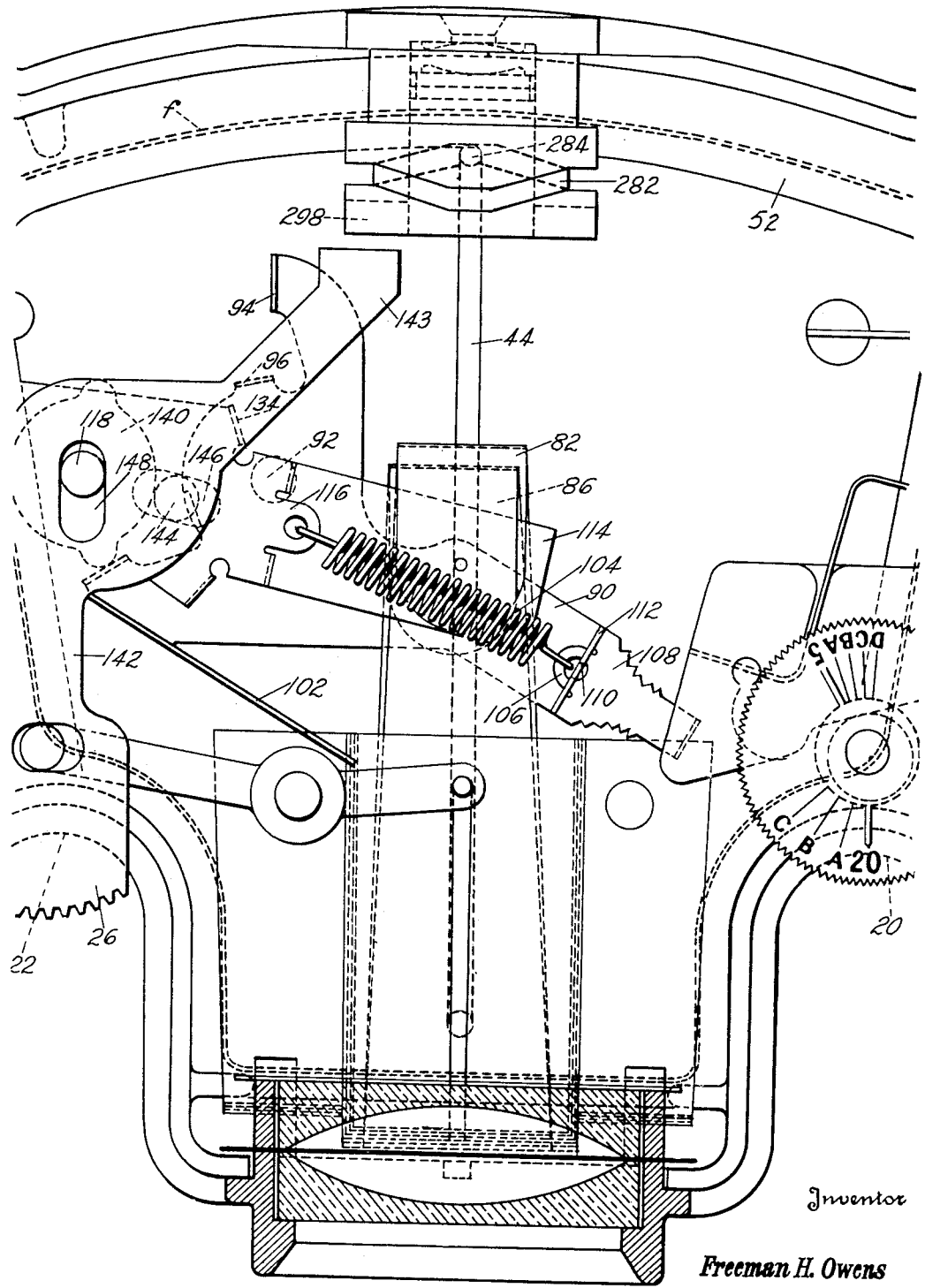
Figure 4 is a horizontal section taken on the line 4—4 of Figure 1, certain parts being omitted for clarity.
Figure 5:
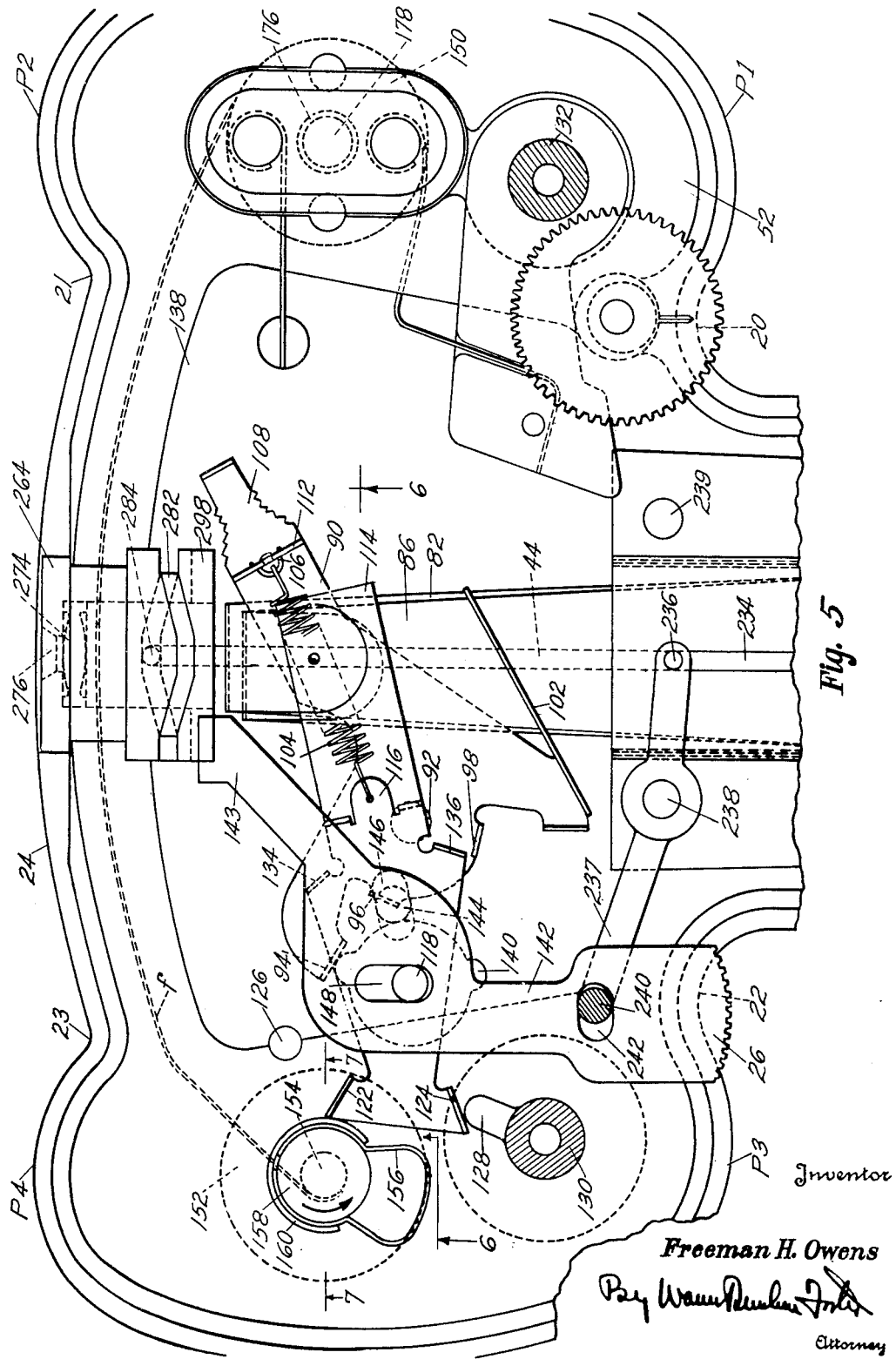
Figure 5 is a vertical section generally corresponding to Figure 4 and taken on the line 5—5 of Figure 3 but showing the shutter control parts in the position to which they have been moved after an exposure has been made, certain parts having been omitted for clarity.

The construction and operation of control mechanism for my shutter and its interlock with my take-up will be clearly understood from Figures 4 and 9 which show the parts in position ready to take a picture and Figure 5 which shows the parts in the position to which they have been moved by the act of making an exposure. Figure 6 shows in section certain of the shutter-control parts in the position of Figure 4.

The rearward end of shutter spring plate 82 is turned back upon itself and by a rivet 88 is attached to an irregularly shaped primary exposure shutter lever 90 pivoted for rotational movement upon a pin 92 set in intermediate wall 52. It will be noted that wall 52 serves as a floor and support for the shutter operating mechanism and a ceiling for the dark or viewing chamber, as well as establishing the bottom of the viewing chamber. This lever 90 is formed with upstanding lips 94, 96, 98 and 100 the purpose of which will later become evident. Also it includes an upstanding and off-set sight blocking flange 102 which cooperates with the finder view system in a manner later to be described.

Movement is communicated to this primary pivoted lever 90 by a toggle spring 104 one end of which is connected to an ear 106 in a tension stub flash light synchronizing brush link 108 which extends through an opening 110 (Figures 4 and 6) in an upstanding portion 112 of shutter lever 90. This stub link in effect forms a rightward extension of this shutter lever as viewed in Figures 4, 5 and 6. Thus shutter lever 90 operates my flash synchronizing device, which is not described in this application. The single spring 104 when actuated furnishes all the force which operates both levers to make an exposure and to prepare for a following exposure, in comparison with the two or more springs conventionally employed in camera shutters.

This primary shutter lever 90 in turn is operated by an irregularly shaped intermediate or cover-up shutter lever 114 having a spring attaching ring or lug 116 to which one end of toggle spring 90 is attached. The other end of this toggle spring is attached to the corresponding ear 106 in the leftward portion as viewed in the drawing of synchronizing stub link 108, thus producing a tensioned stub brush link and applying tension to the control button 26. This intermediate lever 114 is pivoted upon a stud 118 which as later described serves other purposes also. As by a rivet 120 this intermediate lever is directly attached to the cover-up shutter 86, the rearward end of which is doubled back upon itself for this attachment. Thus pivotal movement of intermediate link 86 by push button 26 directly moves the cover-up shutter while differential toggle movements communicated through increased tensioning of spring 104 operate the exposure shutter, all as later described. Thus this single spring also effectuates the operation of a flash light and the exposure of the film. The leftward end of this intermediate lever as viewed in the drawings terminates in two upstanding lips 122 and 124 the outer surfaces of which coact respectively with a stop lug 126 upstanding from the intermediate wall 52 and a stop lug 128 which is a backward extension from a lug 130 which together with lug 132 (Figure 5) rises from the intermediate wall 52 and is threaded for screws (later described) which hold cover 58 in operative relation to the camera as a whole. Two lips 134 and 136 extend downwardly from this lever 114. As will be noted from Figures 4 and 5 a central portion 138 of intermediate wall 52 is sunken to accommodate these lips and certain of the above parts. A boss 140 acts as a stop for lips 96 and 100.

Exposure is actuated by manual movement of primary operating link 142 having a blocking projection 143 cooperating with the lens and parallax control as later appears. The forward end of this link terminates in the push button 26 which extends through re-entrant curve 22 of outer wall 16 of the camera where it is easily available to a finger of an operator upon the hand by which he holds the camera, all as previously described. See Figures 4 and 5. A pin-like formation 144 extending downwardly from the operating link 142 moves in a slot 146 of intermediate or cover-up shutter lever 114 and thereby transmits to it the movement imparted by push button 26. Such movement of control link 142 is guided by stud 118, upon which the intermediate link is pivotally movable, working in a slot 148 formed in this push-button link.

By reason of this construction it will be seen that when a user pushes button 26 inwardly he breaks the toggle and moves both the cover-up and exposure shutter through the exposing position thereby taking a picture. Contrary movement to re-set the shutter is afforded by revolution of a take-up spool to bring a fresh portion of a film into position in the manner which I am about to describe. It should be noted that after button 26 is moved to exposure position it remains disabled until the shutter has been reset. Movement of this button is positive in each direction.

As will be clearly seen in Figure 5 a film f extends from a delivery spool 150 across the exposure aperture 63 (Figure 3) and is wound upon a take-up spool 152. This take-up spool is supported by a shaft 154 which may be revolved as shown in my said parent application as by button 91 thereof or by the devices herein later described. As illustrated in Figures 5 and 9 a cam in the form of a friction or leaf spring 156 supported upon an enlargement 158 of take-up shaft 154 is held in position by a spring clamp 160. Thus actuating cam 156 is frictionally mounted so that it forms a slip clutch and, as later explained, provides lost motion. Figure 5 shows the parts just after an exposure has been made and before the take-up has been rotated. By reason of this construction revolution of take-up shaft 154 in a counter-clock-wise direction as viewed in the figures and as shown by the arrows of Figures 5 and 9 when the parts of the shutter-control mechanism are in the above after-exposure position of Figure 5 brings cam 156 against the inner side of lip 122. As revolution of shaft 154 is continued in order further to draw the film into proper position for another exposure it will force the shutter control mechanism from the position of Figure 5 to that of Figures 4 and 9 thus in a manner later explained re-setting the shutter preparatory to another exposure and winding up film which has just been exposed.

I have now described the structure of my shutter control and the button which actuates it and the take-up device which re-sets it as a film is taken up and will now present the mode of operation first of my shutter exposing mechanism and then of my shutter re-setting and film re-winding device. It will be assumed that the take-up or film winding mechanism has been operated to re-set the shutter and that the parts are disposed in the position shown in Figures 4 and 9, the cam-spring 156 being in the dotted line position of Figure 9. With the parts so disposed a fresh frame of film has been placed opposite the exposure window 63. (With the cam in the full line position of Figure 9 the shutter has been set but the film not fully wound, as later described.) As is later explained, a control member for the lens and iris openings is positioned so that one of the iris openings is aligned with the photographic lens; otherwise the parts could not have been moved to this position. Thus the camera is ready for a picture to be taken.

When the push-button link 26—142 is operated by being moved inwardly parallel to the axis of the lens through pin 144 and slot 146 it moves the intermediate or cover-up link 114. Almost instantly lip 134 of link 114 is moved to a position to the left of lip 96, as viewed in the drawings, of the primary shutter lever 90 thus blocking movement of lever 90 (in a clockwise direction). Thus the shutter lever and the exposure shutter 82 attached thereto are held motionless while further movement of lever 114 under impulsion of button 26 increases the tension upon spring 104 and breaks the toggle. When this movement has progressed to the point that the cover-up shutter 86 attached to lever 114 has cleared the lens, which at this point is blocked only by an opaque portion of the exposure shutter blade, lip 134 of the cover-up link 114 passes beyond the edge of lip 96 of the primary link 90 and releases that link so that as the toggle is broken and the full power of spring 104 is applied to the shutter lever 90 and the shutter plate 82 which is attached thereto. The exposure is therefore made as opening 84 passes in front of the lens. The shutter as it is thus released is always under the same tension since the spring is pulled the same distance and in the same direction each time the push button is operated. Since the actual movement of the shutter blade is completely beyond the control of a user he cannot interfere with the proper timing of the exposure.

After the exposure has thus been made the shutter control mechanism will be in the position shown in Figure 5. Lip 124 now rests against stop or lug 128 and lip 94 rests against the upper portion of stop 140, as viewed in Figure 5. Nothing can be done until at least a portion of the exposed frame is wound upon the take-up spool and a fresh frame thereby moved from the delivery spool.

As take-up shaft 154 is revolved to move a fresh frame into place opposite aperture 63 cam spring 156 is bodily rotated until its leading relatively flat side engages the flat inner side of lip 122. Further rotation causes it to move lever 114 in the direction opposite that in which it is moved by inward movement of button 26 and thereby to re-set the shutter. After a very short initial movement of cover-up lever 114 its lip 136 is disposed to the left of and in alignment with lip 98 (as shown in the drawings) blocking the operation of the primary shutter lever 90 and the re-setting of the shutter until after the cover-up shutter 86 has blocked the iris opening. As soon as this protection has been afforded lip 136 moves beyond lip 98, and toggle spring 104 snaps the shutter back into position ready for another exposure after the movement of the film has been completed and disposes the shutter control parts as is seen in Figure 4. Lip 100 then rests against the lower side of boss 140 as viewed in Figure 4. Also button 26 is returned to operative position.

I shall now explain the operation of this portion of my invention in combination with the shutter-control mechanism the actuation of which has just been described.

After an exposure has been made my cam 156 and lips 122 and 124 of lever 114 are disposed in the position shown in Figure 5. To wind up the film the shaft 154 and with it cam-spring 160 are rotated in the direction of the arrow, from the position shown in Figure 5, until its flat and leading side rests against the inner surface of lip 122 and moves lever 114 clockwise as has just been stated. This movement breaks the toggle thereby re-setting the shutter. Further rotation after the shutter has been tripped brings the control cam-spring to the full line position of Figure 9. At this point, therefore, the control cam 156 is disposed in the position it assumes after the take-up button has been rotated sufficiently to re-set the shutter and begin to wind up the film but not sufficiently completely to wind up all the film which has just been exposed. Upon further winding up movement the cam spring 156 passes the upward and leftward face of lip 122. The outer face may be slightly compressed inwardly as it passes the outer or leftward end of lip 122. The cam then continues to describe the partial circle indicated by the dotted line until its leading side engages the outward or leftward tip of the lip 124, all as shown in dotted line in Figure 9, where in effect it is locked. With the parts in this position further rotation of take-up shaft 154 to complete the winding of the film is possible because cam spring 156 because of its frictional mounting slips upon enlargement 158 of the take-up shaft. The tension of spring clamp 160 against lip 122 is sufficient to overcome the tension of the toggle 104 of the shutter operating mechanism so that rotation of shaft 154 acting through cam spring 156 re-sets the shutter but insufficient to prevent the rotation of shaft 154 after the cam spring has engaged positively the leftward end of lip 124. Thus the cam spring is held motionless during further rotation of the take-up shaft in a winding up direction. It will be noted that the relative angles between the inside of lip 122 and the operative portion of cam spring 156 are such that the full force of the cam operating on a short radius as it is first rotated under the influence of shaft 154 is brought to bear upon lip 122 until the toggle is broken. Thereupon when the parts assume the position shown in full line in Figure 9 the end of cam 156 is ready to pass the corner of lip 122. When the next exposure is made by movement of button 26 lips 122 and 124 are moved to the position of Figure 5.

Since the mass of film upon the take-up spool constantly increases as further exposures are made the number of revolutions necessary to bring a fresh "frame" into position decreases. In order to avoid elaborate and expensive counting mechanism and devices associated therewith, I make use of the conventional number system upon the paper backing the film whereby a user continues to rotate the take-up spool until a number indicating exact alignment of a fresh "frame" at the aperture is seen through the protective window in the rear.

Reference is made to Figures 12 to 16, both inclusive, later described, which show an important variant of this invention. This variant, although markedly different in mechanism, operates according to the principles just described.

As will be clearly seen in Figure 7 the enlargement 158 of take-up shaft 154 includes a bayonet connection 162 adapted to interfit with upwardly extending prongs 164 of take-up spool 152. This shaft 154 extends upwardly through an appropriate opening in top plate 58. Reverse winding is prevented by a wire spring 166 coiled about the shaft. A take-up knob 168 held at 170 at the top of this shaft furnishes a convenient finger-hold by which a user is able to wind up the film f. The delivery and take-up spools are held in position by the ends of a leaf spring 172. Shaft, knob and spring are assembled upon the cover plate. The portion which holds the delivery spool 150 in place is not shown but is constructed similarly to that which is applied to the take-up spool. Bosses are disposed below these ends of spring 172, that for 174 having an opening for the reception of the take-up spool being shown in Figure 7. A rivet, not shown, in the center of this spring supports it upon the bottom wall 28. The mounting of the delivery spool 150 will be clear from the foregoing. An opening 176 (Figure 5) receives a pin 178 on the top of the spool, and the lower end is supported by the other end of the spring 172 the take-up end of which is shown in Figure 7. A boss, not shown, provided for the delivery spool is similarly constructed.

Figure 7 also shows my novel supporting, tensioning and guiding spring 180. As will be noted, this spring, which is supported upon an adjacent side of the casing by a connection, not shown, has an upper off-set portion which bears against the edge of the upper rim or side of take-up spool 152 and a lower portion which bears against the paper backing of the film f as it is wound upon the take-up spool 152 and a lower portion which bears against the paper backing as it is wound upon the take-up spool. As a matter of practice I have found that this off-set upper portion of this single spring furnishes sufficient support, guidance and tension so that I may dispense with spring 172, and depend for the positioning of the lower portion of a take-up spool upon opening 174 in the above mentioned boss. As spool 152 is revolved the tension of this spring as it bears against the paper backing is sufficient to hold the film in proper alignment and also simultaneously to apply enough lateral tension so that the film is wound tightly upon the shaft of the spool.

The bottom wall 28 is detachably connected with the remainder of the camera as by the devices described in my said co-pending application Serial No. 326,419, and in my parent patent.

To place a fresh film in position a user merely separates the bottom wall 28 from the unit which makes up the entire top portion of the camera including the side walls and places the fresh film upon the delivery end of the spring 172. The two parts are unlocked and later locked together in the manner described in said last above mentioned co-pending application or in any other convenient fashion. An empty take-up spool is thereupon placed in position and the film threaded in the usual manner across the exposure aperture 63. Before the wall 28 is replaced a user rotates the spool, if necessary, to cause the bayonet lock 162 and the prongs 164 to engage.

The original assembly of top plate 56 and the remainder of the camera is most simple. See Figure 8. As described in connection with Figure 5 bosses and stop lugs 130 and 132 rise from the upper plane of intermediate or common wall 52 of plate 18. The top wall opposite these bosses is formed with oppositely disposed similar indentations of which only one 182 is shown. A fastening device or bracket 184 having an opening for the reception of a screw 186 (or a rivet) and a ring 188 to which is attached a larger ring 190 fits within these openings. The construction upon the other or rightward side as viewed in Figure 5 is the same. A holding cord or strap 192 or other support is passed between the ring 190 and the corresponding ring on the other side. After the bracket 184 has been positioned assembly of the top is completed by screws or rivets 186.

My combined shutter releasing, shutter re-setting and take-up mechanism just described is operatively interlocked with my finder system, my adjustment of the photographic lens, and my iris apertures for the lens. I shall now briefly present each of these elements and explain how each affects the novel mechanism just described and how that mechanism is inter-related with each of these elements.

Front panel 12 includes a forwardly facing exposure recess 73 (Figures 1 and 3) terminating inwardly in an opening 72 in line with camera lens 34 on mount 32 operated by control rod 44 in a manner later described. Cooperating with this opening is an iris plate generally indicated as 200, shown in Figures 2 and 3, pivoted upon front panel 12 upon an indicating and handle member having a finger hold, pointer and lever 202 external to the plate and a stem 204 passing through an opening in the front wall and attached to the iris plate 200.

Figure 2:
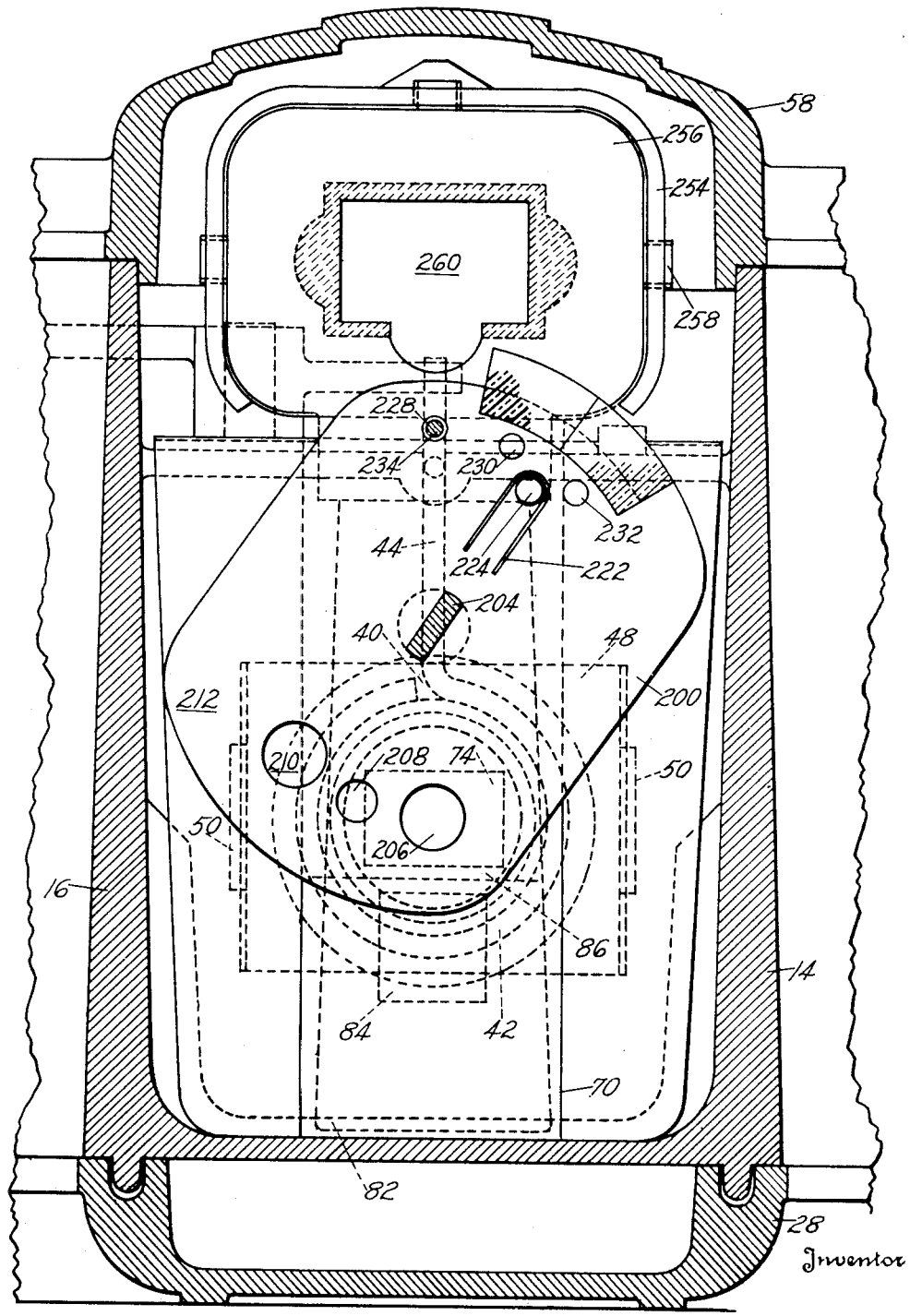
Figure 2 is a vertical section taken on the line 2—2 of Figure 3, a front view finder panel having been removed.

As shown for purposes of illustration only and as is best seen in Figure 2 three photographic apertures or openings 206, 208 and 210 in this iris plate are selectively disposable in line with the optical axis of the lens. I may use any desired and practical number. Beyond or to the left as viewed in Figure 2 is an opaque portion 212. As shown opening 206 is full and for use with a color film; 208 is relatively small and represents an opening stated for purposes of illustration only to represent f11; while the remaining opening 210 is large and represents a diaphragm opening of f8. As pointed out in my co-pending parent patent, I find it desirable to place a photographic lens within the interior of a camera so that it cannot readily be tampered with or soiled by an unskilled or careless user. I therefore prefer to arrange opaque portion 212 of the iris plate within the interior of the camera between the fixed exposure opening in the front wall of the camera and the lens to afford complete protection when the camera is not in use and so that an exposure can not be made by inadvertence. As will be seen from Figure 1, I supply indicia 214, 216, 218 and 220 respectively as "Color" "11" "8" and "Closed" corresponding to the openings of the iris plate and the opaque portion as previously described. When finger-piece or handle pointer 202 is moved to each of these indicia an exposure opening or the opaque portion of the iris plate corresponding thereto will be disposed before the lens. Other results obtained by movement of this finger-piece will later be presented.

To hold this iris plate in the positions to which it thus has been moved I form a detent by a simple deformation of a portion of the iris plate. As will be seen from Figures 2 and 3 a portion 222 of this plate is bent at 224 to form a spring detent lock which successively engages each of a series of detent openings of which only one 226 is shown formed in the rearward surface of the upper center portion of the rear surface of front panel 12, as shown in Figure 3.

Adjacent and above this formation three locking openings 228, 230 and 232, one for each iris opening, 206, 208 and 210 respectively, are formed in this iris plate for the reception of my locking rod 234 which is interlocked with my shutter control and take-up mechanism of which it is a part. This rod extends rearwardly and is turned upwardly at 236 to be movably attached to locking lever 237 pivoted upon pin 238 which with pin 239 assists in holding in place the multiple guideway for the shutter blades 82 and 86. These pins pass through openings 81 shown in Figure 10. Locking lever 237 by upstanding pin 240 working in oversized slot 242 of operating link 142 is connected to my shutter operating and take-up mechanism for joint control therewith. By reason of this construction it will be seen that if an attempt is made to move control button 26 backwardly in order to make an exposure at a time when the forward end of locking rod 234 is disposed opposite a solid portion of the iris plate between openings 228, 230 and 232 the exposing mechanism will be blocked so that it is impossible to release the shutter. If, however, locking rod 234 is free to enter one of these openings the control linkage can be operated and a photograph made. Thus other common sources of trouble for careless or unskilled users of a camera are prevented.

An examination of Figures 4 and 5 will make clear the operation of the upstanding and off-set flange 102 which extends from intermediate shutter operating lever 90 forwardly and toward the right as viewed in those figures. After exposure-control button 26 is pushed backwardly so that an exposure is made this flange moves from the position of Figure 4 to that of Figure 5 wherein it obscures the view finder system. When, however, the mechanism is disposed in picture-taking position as shown in Figure 4, with the shutter reset and the exposed film wound up and a fresh frame in position, the view through the finder system is unobstructed thereby. I thus provide a visual signalling instrumentality operated by the shutter system and disposed within the view finder lens system so that a user can readily determine whether or not the apparatus is in proper position to make an exposure and receive a clear warning if it is not.

As presented in my said co-pending application Serial Number 326,419 this iris plate also carries elements of a device which performs the function of an extinction photometer and indicia as to the iris opening then in operative relation to the lenses and visible through the view finder lens system.

My view finder system will best be understood by inspection of Figures 1, 2 and 3. This system is closely interlocked with this iris plate and with the photographic lens and is controlled jointly with shutter and take-up. Within a front finder frame 246 in front panel 12 I place front finder opening 248. Rearwardly thereof I vertically mount two plano-concave finder lenses 250 and 252, within a recessed formation 254 extending backwardly from the upper portion of front of panel 12 with the concave surfaces adjacent and spaced from each other. See Figure 3. A fixed finder mask 256 with lips 258, which has a viewing opening 260, disposed behind these finder lenses, secures them. Suitable openings are cut in the rearward portion of recess 254 for the reception of this plate and its retention in operative position.

A lower portion of this mask is bent into lips 261 and 262 which assist in locking into position my three flanged shutter guideways 76, 78 and 80 previously described which form a side-walled channel through which my resilient exposure shutter blade 82 and cover-up blade 86 move from and to exposing position.

The rearward or ocular carrying portion of my finder system will be seen in Figures 3, 4 and 5. An ocular is eccentrically mounted in such manner that the field of view is changed as the focus of the camera is changed, thus reducing parallax, this control member and the shutter and take-up mechanisms and this iris plate being interlocked. A multi-purposed control or cam member 264 is rotatable upon a fixed axis at the rear of the camera, its rotation through a suitable connection moving the camera lens to focus the instrument. Legends indicate the setting of photographic lens 34. An inner forwardly extending portion 266 of this control member rotates in an opening 268 formed between depending formation 270 of top wall 58 and upstanding formation 272 of intermediate wall 52. An ocular 274 disposed toward the interior of the camera from a recessed sight opening 276 is eccentrically mounted in a central opening 278 of the control member 264 for rotation therewith. The ocular is held in place by a spring ring 280. Because of this eccentric mounting it will be seen that rotation of the control member from one focus-position to another minimizes the results of parallax by changing the field of view in the finder to correspond generally to that of the camera lens. As later described this focus device is operatively interlocked with my shutter and take-up mechanism.

As previously stated photographic lens 34 is disposed in mount 32 for movement forwardly and backwardly in opening 30. Control of this lens is closely articulated with the view finder lens system just described. A cam slot 282 which encircles finder control member 264 is one of a small train of simple members through which the photographic lens is moved between various settings. Such movement is automatically accompanied by the elevation or depression of the ocular of the view finder to adjust for parallax. Control rod 44 with an upstanding rearward follower end 284 which engages cam slot 282 is attached to the lens and moves it as previously described. This rod works and is guided in a groove 286, omitted for clarity except in Figure 6, in the top of intermediate wall 52.

A leaf spring 288 is pivoted (by its leftward upper end as shown in Figure 3) upon lug 290 depending from top plate 58 and guided between two similar but spaced lugs of which only one 292 is shown. The free end of this spring bears upon a flat surface 294 formed in the forward edge of control or cam member 264 when the parts are in the position shown in Figure 3. When this cam member is rotated to an opposite position this end of the spring bears upon a flat surface 296 formed diametrically opposite to hold the control member in the position to which it has been moved. A number of flat surfaces corresponding to the number of operating positions (shown for purposes of illustration as only two) of course is to be provided.

By reason of this construction it will be seen that rotation of ocular carrier 264 as shown in Figure 7 from the position shown in Figure 3 will tend bodily to raise ocular 274 and at the same time by means of follower 284 working in cam slot 282 through rod 44 will move photographic lens 32 forwardly away from the film thus bringing a near scene into focus. As the eye piece of the view finder is thus raised compensation for parallax between the finder lens system and the camera lens will be afforded. Correspondingly as the control member 264 is rotated to a distant setting the lens is moved rearwardly and the ocular of the view finder is lowered, thus again compensating for parallax. Thus it will be understood that through this simple mechanism interlocking the camera lens and the view finder lens system the effective focal length of the camera lens is changed and parallax is overcome.

This member 264 which focuses the camera and overcomes parallax also controls the exposure-making shutter-resetting mechanism and the take-up operation. This interlock is also operatively interconnected with the setting of an iris opening in alignment with the camera lens. To this end I form a central annular exposure-control slot 298 as best seen in Figure 6, in cam control member 264 in a plane intersecting the optical axis of the ocular. For simplicity I show only one slot but as many are provided as are necessary for the number of fixed focus settings involved. This control slot is aligned with the projecting control extension 143 of operating line 144 which in turn is an extension of control button 26. As will be readily understood unless the control slot is aligned with the control extension it is impossible to move the button 26 to make an exposure. Consequently my camera is effectively locked against operation except when the lens has been moved to a pre-determined focus setting of the camera. Also, the connection between the iris plate and the shutter releasing and take-up mechanism is interlocked with the lens and parallax control devices through links 234, 237, 142 and 143.

I shall now describe a variant of my invention of a simplified common device for operating a shutter and take-up mechanism. See Figures 12 to 16 both inclusive. This form of my invention is disclosed in my said parent patent. The essence of the two embodiments is the same but the form which I am about to present is radically different in certain elements of construction. One embodiment is better adapted to certain basic camera structures and to different types of shutter than is the other. Each is characterized by a resilient or lost motion motion-transmitting cam element disposed between a take-up button and a shutter re-setting mechanism. Both dispense with the counters, clutches, and other elaborate devices of the prior art.

The housing for this one my novel and improved cameras generally indicated as 300 consists essentially of a front support 302, a rear support 304 and an internal support or so-called "cone" 306 which is rectangular in cross section and actually takes the form of a frustum of a pyramid. The front and rear portions dove tail and are held together and supported in a manner which is described and claimed in my said co-pending application Serial Number 326,418, filed December 17, 1952. This arrangement is such that the two parts of the camera can be easily separated for a change of film and then replaced. Support 302 includes a chamber 308 at the top thereof at the forward end of which is inserted one element 310 of a finder lens combination, this element being held in place by a mask 312 which is claimed in my last previously mentioned application controls the setting of a photographic lens 314. Ocular finder element 315 is disposed at the rear of this chamber. A window 316 equipped with red safety glass or a plastic sheet is inserted in the rear support 304 so that a user may observe the number of the next picture to be exposed. I prefer to cast this front support in one piece, preferably by making an injection moulding of a synthetic resin, but, if desired, it may be built up element by element.

Cone 306 is assembled upon the front support 302. Its rear surface 318 is an exposure window (Figure 13) which is aligned with the photographic lens 314 mounted in the forward portion of the frustum. The rear surface of this window furnishes a smooth platen or gate over which the film travels. Light leaf springs 320 and 322 which bear against one surface of the backing paper P of this film, or of the film of my invention is applied to a camera for use with films not having backing paper. These springs are held in place by rivets which join the cone and the front portion of the camera. What one might term the static or inoperable portions of the interior of the camera are completed by a simple baffle plate 324 which serves both to exclude light from the film receiving portion of the apparatus and to assist in the positioning and support of the cone and other parts. A conventional female screw 326 standard in thread is provided in the front support to receive a male screw of a tripod.

It will of course be understood that each of these three main supports is preferably cast as one piece either of metal or a plastic. For details of this structure see my last above mentioned application and my parent patent. From the above portions of this description and from a consideration of Figure 14, it will be evident that the above construction provides in the forward support 302 vertical protuberances 328 and 330 and in the rear support 304 similar protuberances 332 and 334 which are in part generally circular in cross section. Such protuberances correspond to protuberances P1 and P3 and P2 and P4 respectively previously described and perform the same functions. They furnish surfaces which can be firmly gripped by the thumbs and fingers of a user and also help provide space wherein may be placed both a delivery spool 336 and a take-up spool 338 for the film which is being exposed and also storage space for spools 340 and 342 for films which either have already been exposed or are awaiting exposure. As described in my last above mentioned application I provide an alternative construction wherein I substitute cells for a flash-gun and flash-light for these spare films. Alternatively other supplies or accessories useful to a photographer can be stored therein.

Figure 12:
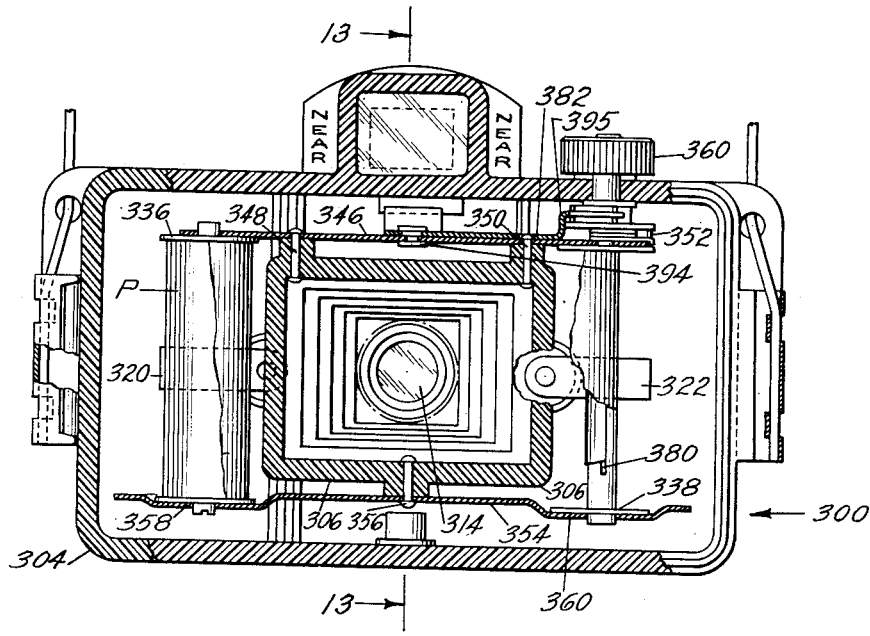
Figure 12 is an elevational view, partially broken away and partially in section, of the front portion of one of my cameras with which this invention is employed, looking forwardly, the cover having been removed.
Figure 13:
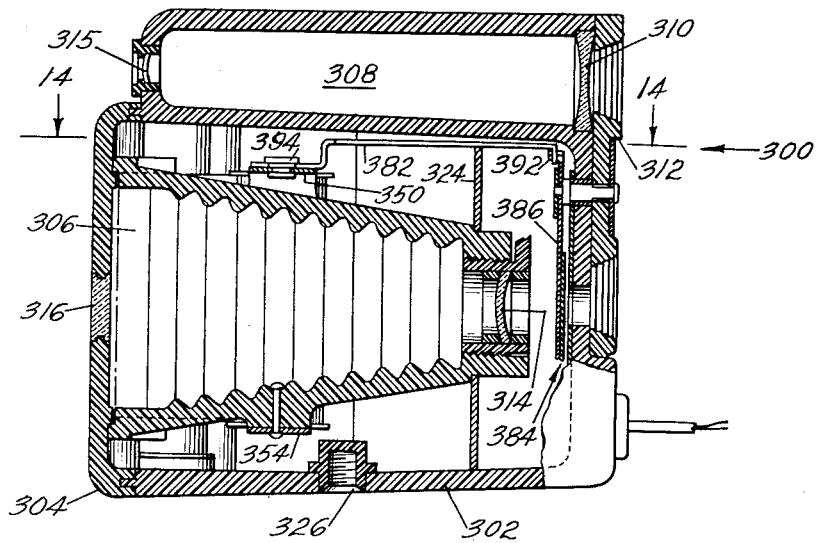
Figure 13 is a vertical central section partially broken away taken on the line 13—13 of Figure 12, certain parts being omitted for clarity.

As will best be understood by reference to Figure 12 the operative rolls of films 336 and 338 respectively are supported at the top by a flat narrow plate or strip 346 which is pinned at 348 and 350 to cone 306, and of course assembled therewith prior to the positioning of the cone within the front support 302. Each roll may be wound with a conventional light-excluding protective paper P, for simplicity omitted from some views, although it is understood that my invention may be applied to a camera of a type which accommodates film, such as that of 35 millimeters in width, which is ordinarily used without a paper backing. An appropriate opening in the left end of this strip 346 is formed for the reception of the spindle of spool 336. Winding of take-up mechanism for take-up spool 338 will later be described. The right end of this plate at 352 is bent upwardly and has a squared end for a purpose which will be described in connection with the take-up roll. In order to support these rolls at their lower ends I provide a novel resilient plate 354 which is mounted at its center by a single pin 356 to a boss in the bottom of the supporting cone. This plate is formed with cups 358 and 360 for the reception of the respective spools, with the novel formations claimed in my last above-mentioned application. These formations apply tension to the edges of the sides or flanges of the respective spools, this tension being resilient since the plate is made of spring metal. As a consequence enough tension is exerted upon the film as it is wound up to keep the film flat at the aperture of the camera. The alternative construction described and claimed in my said last previously mentioned application may be substituted if desired.

Figure 15:
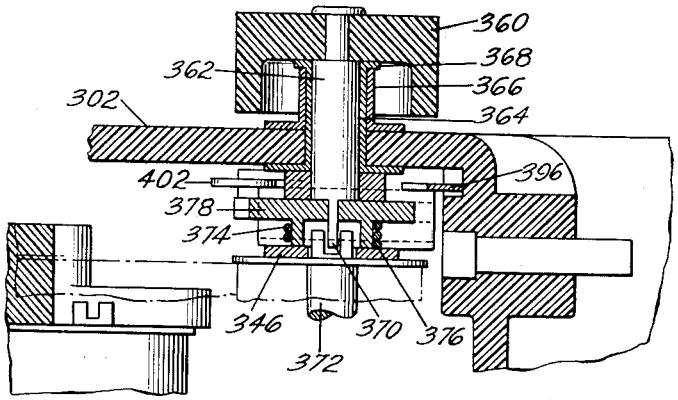
Figure 15 is an enlarged section taken on the line 15—15 of Figure 14.
Figure 14:
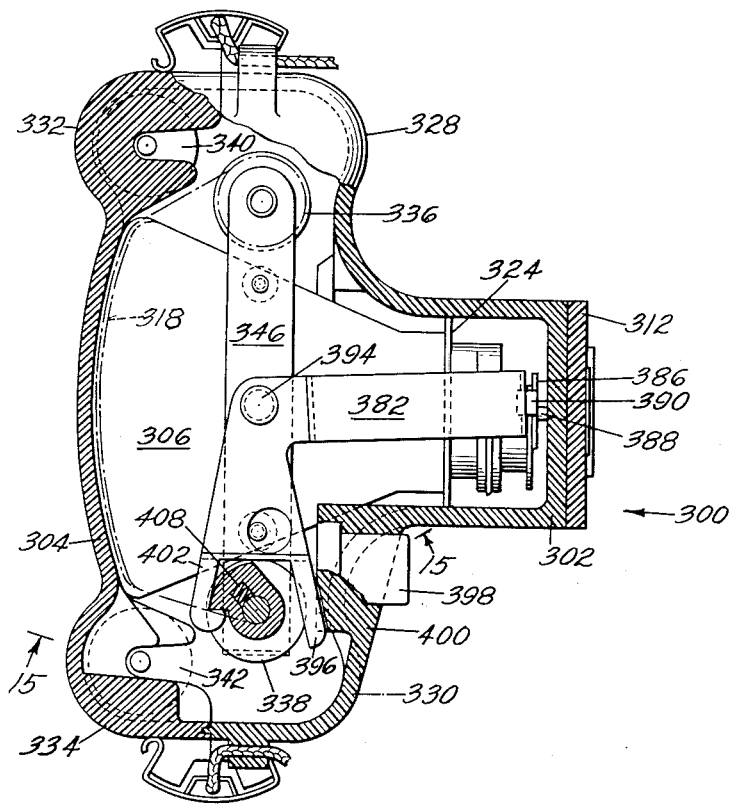
Figure 14 is a top plan view partially in section taken on the line 14—14 of Figure 13.

The manner in which the film is wound or taken up will be clear from a consideration of Figures 12, 14 and 15, with particular reference to 15. A winding button 360 is attached to a reduced portion of a shaft 362 revoluble within a bearing 364 placed in an upper wall of forward front support 302. This bearing in turn is positioned by another bearing or tube 366 which engages its vertical outer surfaces and is retained by and below an upper horizontal collar 368 formed upon bearing 364 and extending outwardly from it away from the shaft. These bearings are formed with lower collars which respectively engage the inner and outer surface of support 302. This novel structure can be quickly and cheaply assembled. A tongue connection 370 which is an elongation of the same shaft 362 cooperates with a usual slot in a spindle 372 of taking up roll 338. This one shaft accomplishes a plurality of useful results. It will thus be understood that rotation of button 360 clockwise as shown in Figure 15 will advance the film through the above described construction. A wire spring 374 is wound about a depending flange 376 of ratchet plate 378 which is fixed to shaft 362. This plate is primarily useful in preventing further rotation of the take-up spool after the film has been completely wound thereupon, all as is described and claimed in my last above-mentioned application. The other end of this spring 374 is attached to a bent-up rightward extension 352 of strip 346 previously described. By reason of this arrangement of this spring it will be clear that a photographer may freely wind the take-up roll in a take-up direction, subject to the control mechanism later described, but is prevented from winding the take-up roll in a contrary direction.

To place a fresh film in assembled relation with the camera a user first separates the front and back supports and springs down cup 358 thereby freeing the roll in the take-up position which has just been fully wound up. He next places an empty spool in this position. Then he moves cup 356 downwardly and places a spool 336 of unused film in the delivery position. He thereupon unrolls a portion of the backing paper P and places its end in a slot 380 (Fig. 12) which is provided in spindle 338. The resilience of plate 354 serves to hold this fresh spool in the cup. Thereupon he re-attaches the two parts of the camera.

As will be evident from the previous portion of this description means are provided for re-setting the shutter by the film take-up thus making it impossible to make a second exposure until the take-up has been operated and a fresh film wound toward exposure position. A single master control lever 382 operates my shutter generally indicated as 384 both for exposure and re-setting. For full description of this shutter reference is made to my parent patent and my last above mentioned co-pending application. My novel control mechanism can be applied to any appropriate shutter mechanism but I have found this shutter peculiarly well adapted to this combination. As shown in skeleton herein my shutter has an operating plate 386 the rocking of which upon pin 388 by movement of master lever 382 makes the exposure. As in the previous embodiment of this invention, the shutter is operated by a single toggle spring, not shown in connection with this shutter but fully described in my parent patent. An ear 390 (Figure 14) extending backwardly from shutter plate 386 is disposed between ears 392 extending downwardly from master lever 382 and thereby forms the necessary operating connection. Master lever 382 is pivoted upon pin 394 which for convenience is mounted upon plate 346 and cone 306.

The rightward and upper end of this lever from the standpoint of a user of the camera or the lower end as shown in Figures 14 and 16 is bent upwardly as seen at 395 into two formations away from its body portion toward the top of the camera. Its end is bifurcated. A forward leg 396 or left fork of the bifurcation, which has a motion-receiving function, is engaged by control button 398 which is mounted in a rectangular opening in a relatively straight boss 400 which extends across the top of the finger holding depression in the right side of the forward wall of the camera. Inward movement of button 398 (or movement leftwardly as viewed in the above figures) rocks this master control lever in a clockwise direction upon pivot 394 and thereby moves shutter control lever 386 so that it makes the exposure.

Left fork or back leg 402 (as viewed in Figures 14 and 16) of control lever 382, which has a holding function, terminates in a pawl 404 which engages a ratchet tooth 406 which is cut on the periphery of a control cam 408 which is frictionally mounted for movement with and relatively to take-up shaft 362. A compression spring 410 placed within an appropriate opening in this cam and bearing against the shaft makes it possible for revolution of the shaft to move the cam so that its ratchet engages the pawl but permits further movement of the shaft thereafter. I thus provide a lost-motion connection operated by a take-up associated with a cam which positively re-sets a shutter. When button 398 is moved inwardly toward the camera or backwardly to make an exposure or to the left as viewed in Figures 14 and 16, the pawl and ratchet are separated and shaft 362 left wholly free to move in a winding-up direction—counter-clockwise as viewed in these figures. Figure 16 shows such movement as having been made. Further movement of this cam in such direction, however, brings it into contact with right leg 396 of the control lever 382 and thereby re-sets the shutter by moving the control lever back from the position of Figure 16 into that shown in Figure 14. Still further rotation brings pawl 404 into contact with ratchet tooth 406 as shown in Figure 14. Since a single rotation is not enough to advance a sufficient length of film into picture taking position the user continues to rotate the button 360 against the relatively slight power of spring 410 until the next number upon the paper P indicating a fresh frame of the film appears at window 316.

It will therefore be understood that Figure 14 shows this mechanism after one exposure has been made and the film wound into position for taking the next exposure while Figure 16 shows these parts in the position which they assume after an exposure has been made by movement of button 398 but before knob 360 has been rotated to bring a fresh film into picture-taking position. An exposure can be made when the parts are in the position of Figure 14 but no exposure can be made when the parts are in position as shown in Figure 16.

As previously pointed out this simple arrangement makes it possible for me to dispense with elaborate mechanisms, such as have been previously proposed, to compensate for the increase in the diameter of the take-up roll as the film builds up but to retain the practical advantages of such complicated mechanisms.

The resemblance between this novel construction and that shown in Figures 5 and 9 will be understood, and it will be appreciated that each has peculiar advantages in itself and in its adaptability to combination with shutters of different types.

The advantages of my invention will be clear from the foregoing portion of this specification, inspection of the attached drawings, and consideration of the subjoined claims. These advantages include provision of simple, certain and inexpensive devices which re-set a shutter in a camera by a first portion of an operation which takes up the film, thereby as a practical matter preventing double exposure. My invention brings within the reach of the ordinary amateur photographer, whose funds are limited, articulated and mistake-proof photographic mechanism previously reserved for well-to-do and professional photographers. Other related advantages include improved and simplified interlocks between shutter operating mechanism and focussing, parallax-reducing and light-admitting instrumentalities.

I claim:

1. In a camera, a revoluble take-up for a film, a lens for directing light upon the film, a shutter controlling the admission of light to the film, reciprocably operable shutter operating mechanism which when moved in one or a first direction releases said shutter and when moved in another or a second direction resets said shutter, a control button which when moved in a first direction moves said shutter mechanism in said first direction and is then disabled so that a user is unable to interfere with the normal operation of said mechanism during its cycle of operation, and a connection between said take-up and said mechanism which upon a first portion of the revolution of said take-up operates said mechanism to move it in said second direction and also moves said control button from said first back to said second position so that the user may operate said camera through another and subsequent similar cycle, said connection including a lost-motion device which renders continued revolution of said take-up ineffective on said shutter mechanism until said control button thus has been automatically made re-operable.

2. In a camera, revoluble means for taking up a film, a lens for directing light upon the film before it is taken up, an operable re-settable shutter for said lens, a control button, linkage connecting said button and said shutter for operating said shutter upon movement of said linkage in a first direction and for re-setting said shutter upon its movement in a second or opposite direction, said control button being accessible from the exterior of the camera and operatively engaging said linkage for moving it in said first direction, an operative interconnection between said taking up means and said linkage for moving said linkage in said second direction, said interconnection including instrumentalities for transmitting a first portion of the rotation of said taking up means to said linkage thereby re-setting said shutter and for rendering further rotation of said taking up means ineffective upon said linkage.

3. In a camera having a casing, revoluble means including a shaft for taking up a film, a member external to said casing for revolving said shaft, a lens for directing light upon the film before it is taken up, an operable reciprocable shutter for said lens, re-settable mechanism for operating said shutter, a control button external to said casing for operating said mechanism to make an exposure, said mechanism having a motion-receiving formation, a motion-transmitting formation upon said take-up shaft, the operation of said mechanism to make an exposure removing said formations from contact and said formations then being so disposed that after said shutter has been operated they are spaced from each other and being so disposed that revolutions of said take-up shaft to reset the shutter brings said formations into operative contact with each other so that continued movement of said motion-transmitting formation moves said motion-receiving formation thereby operating said mechanism to re-set said shutter, and a slip mounting for said motion-transmitting formation, further revolution of said take-up shaft therefore being without effect upon said mechanism because of said slip connection.

4. In a camera, revoluble means for taking up a film, a lens for directing light upon the film before it is taken up, an operable shutter for said lens, a toggle operatively connected to said shutter for operating said shutter, a control button, linkage connecting said button and said toggle for breaking said toggle upon movement of said linkage in a first direction whereby said toggle so broken operates said shutter and for resetting said toggle upon its movement in a second or opposite direction, said control button being mounted upon said camera with one portion thereof accessible from the exterior of the camera and another portion engaging said linkage within the camera for moving it in said first direction, thereby operating said shutter, and means operatively interconnecting said taking up means and said linkage for moving said linkage in said second direction, said interconnecting means including instrumentalities for transmitting a first portion of the rotation of said taking up means to said linkage thereby resetting said toggle and for rendering further rotation of said taking up means ineffective upon said linkage whereby said taking up operation may be continued without effecting said shutter and said toggle.

5. In a camera having a casing and employing a flexible film, revoluble means for taking up the film, an operable shutter, mechanism for operating said shutter, a connection between said mechanism and said shutter, said mechanism including a pivoted operating lever, a single operating spring, one end of said spring being attached to said lever and the other end being attached to a fixed point within said casing, the arrangement of said points of connection of the ends of said spring in relation to the pivot of said lever being such that a toggle is formed, the breaking of said toggle in one direction moving said mechanism to make an exposure and the subsequent breaking of said toggle in the other direction moving said mechanism to reset said shutter, an operable control button engaging said mechanism for moving said lever so that said toggle is broken in said first direction thereby making an exposure, a revoluble take-up for the film after it has been exposed, and an operative connection between said revoluble take-up and said lever for breaking said toggle in said other direction thereby resetting said shutter, said spring being under tension after such exposure and resetting operations respectively.

6. In a camera an exposure shutter, means for operating said shutter to make an exposure, mechanism connected to said shutter for re-setting said shutter after an exposure has been made, said mechanism including two spaced motion-controlling formations, a revoluble take-up, an operating element, and a resilient mounting for said element upon said take-up, said element being so disposed in relation to one or a first of said formations that upon the operative revolution of said take-up it transmits motion to said mechanism thereby re-setting said shutter, and said element being so disposed in relation to said other formation that upon further movement of said take-up it engages and is obstructed by said second formation and because of said resilient mounting slips in relation to said take-up thereby permitting further revolution of said take-up whereby the film can be further taken up without affecting said mechanism.

7. In a camera, an exposure shutter, mechanism for operating said shutter to make an exposure and for thereafter re-setting said shutter, said mechanism including a connection with said shutter and two spaced motion-controlling formations, a revoluble take-up, an operating motion-transmitting element, a resilient mounting for said element upon said take-up, said element being so disposed in relation to one or a first of said formations that upon the operative revolution of said take-up it transmits motion to said mechanism thereby re-setting said shutter, said element being so disposed in relation to said other formation that upon further movement of said take-up it engages and is obstructed by said second formation and because of said resilient mounting slips in relation to said take-up thereby permitting further revolution of said take-up further to wind up the film without affecting said mechanism, and an exposure button operatively interconnected with said mechanism and effective for moving it to make an exposure, such movement removing said element from engagement with said second formation ready for another cycle of operation.

8. In a camera, revoluble means for taking up a film, a lens for directing light upon the film before it is taken up, an operable shutter for said lens, operating mechanism for said shutter including linkage, a control button accessible from the exterior of the camera and manually movable from a first to a second position and operatively engaging said linkage for moving it in one or a first direction for making an exposure, said linkage also including a connection to said taking up means, said connection embodying a slip clutch through which revolution of said taking up means moves said linkage in a second direction opposite to said first direction upon the revolution of said taking up means, such movement of said linkage in said second direction re-setting said shutter and moving said control button from said second back to said first position, further revolution of said taking up means being without effect upon said linkage on account of said slip clutch.

9. In a camera having a lens, a shutter for said lens, mechanism for first exposing and thereafter re-setting said shutter, and a take-up for the film so exposed; in combination, a shutter operating lever, a connection between one end of said lever and said shutter, an operative connection between said exposure button and said lever for moving said lever to operate said shutter to expose the film, two spaced formations upon a portion of said lever relatively distant from its connection with said shutter, a take-up operating element rotatable with said take-up which engages a first of said formations and moves said lever to re-set said shutter and moves said second formation across the path of further rotation of said operating element.

10. In a camera having a lens, a shutter for said lens, mechanism for first exposing and thereafter re-setting said shutter, an exposure button, and a revoluble take-up for the film so exposed; in combination, a shutter operating lever, a connection between one end of said lever and said shutter, an operative connection between said exposure button and said lever for moving said lever to operate said shutter to expose the film, a motion-receiving formation upon a portion of said lever relatively distant from its connection to said shutter, and a cam rotatable with said take-up which engages said formation and moves said lever to re-set said shutter and moves said formation so that said cam clears it thus permitting further revolution of said take-up without effect upon said shutter.

11. In a camera, revoluble means including a shaft for taking up a film, a lens for directing light upon the film before it is taken up, an operable shutter for said lens, linkage including a pivoted lever, motion-transmitting connections between said linkage and said shutter for alternatively operating and resetting said shutter upon movement of said linkage, one end of said lever having two motion-receiving formations extending therefrom, a motion-transmitting cam, a resilient mounting for said cam upon said take-up shaft wherethrough the revolution of said shaft moves said cam and said shaft can move while said cam is motionless, said cam and one or a first of said formations being so disposed in relation to the other and the pivot point of said lever that the first portion of the revolution of said shaft in a taking-up operation brings said cam against said first formation and thereupon moves said formation and said lever and link thereby resetting said shutter and moving said first formation so that said cam clears it upon further rotation, such further rotation of said shaft bringing said cam against said second formation, said cam and said second formation being so disposed in relation to each other and said pivot point that further movement of said cam is blocked and said cam slips upon said take-up shaft because of said resilient mounting while further rotation of said taking-up shaft is permitted.

12. In a camera having a casing, revoluble means for taking up a film, a shutter, mechanism connected to said shutter for alternatively operating said shutter to reset it after an exposure has been made and after such resetting to make an exposure, said operating mechanism including a pivoted lever having two motion-receiving formations, a taking up shaft, a cam formation mounted upon said shaft for revolution therewith, said cam formation being so disposed in relation to said formations that the revolution of said shaft first brings said cam formation against a first of said formations thereby moving said lever to reset said shutter, said cam formation thereupon clearing said first formation and engaging said second formation which blocks its further revolution, a control button operable from the exterior of said casing and engaging said shutter mechanism for moving said shutter mechanism for making an exposure, such operation moving such second formation out of blocking relation to said cam whereby upon another cycle of operation of said taking up shaft said cam and said first formation are disposed in such relation that said cycle can be repeated.

13. In a camera, an operable shutter, a revoluble take-up, a cam, a resilient mount upon which said cam is revoluble with said take-up, the resilience of said mount permitting revolution of said cam with said take-up when the movement of said cam is not blocked and permitting further movement of said take-up after the movement of said cam has been blocked, and operating mechanism for resetting said shutter, a cam follower formation, said cam and said follower formation being so disposed that the revolution of said take-up operates said mechanism to reset said shutter, said cam moving free of said follower formation after it has moved it to operate said resetting mechanism, thereby permitting further operation of said mechanism by said cam and a member thereafter engageable by said cam for blocking its further movement while permitting continued revolution of said take-up as aforesaid.

14. In a camera, an alternatively releasable and resettable shutter, means for releasing said shutter, a revoluble take-up a cam revoluble with said take-up, and operating mechanism for resetting said shutter after it has been released, said mechanism having a connection with said shutter and a motion-receiving cam follower formation attached thereto and movable therewith, said cam and said formation being so disposed that the revolution of said take-up brings said cam into operative contact with said follower and moves it both to operate said mechanism to reset said shutter and also to move said follower formation into position wherein said cam clears said formation thus permitting further revolution of said take-up after said shutter has been reset.

15. In a camera having a casing, a revoluble means including a shaft for taking up a film, a lens for directing light upon the film before it is taken up, an operable shutter for said lens, resettable mechanism for operating said shutter, said operating mechanism including a pivoted lever, a control button external to said casing, a connection between said button and said lever for moving said lever in a given direction upon the operation of said button, a connection between said lever and said shutter for operating said shutter upon such movement of said lever, an end of said lever relatively remote from said shutter having two spaced projections, a cam formation, and a slip mounting for said formation upon said shaft, said lever after an exposing operation and said cam formation being so disposed that revolution of said shaft brings said cam formation against a first of said projections thereby operating said lever to reset said mechanism and to move said control button back to operating position and to move said first projection so that said cam formation clears said first projection, continued revolution of said shaft then bringing said cam formation against said second projection, further revolution of said take-up shaft being without effect upon said lever because of said slip mounting.

16. In a camera, revoluble means including a shaft for taking up a film, an operable shutter, resettable mechanism for operating said shutter, said operating mechanism including a pivoted lever, means for moving said lever in a given direction, a connection between said lever and said shutter for operating said shutter upon such movement of said lever, an end of said lever relatively remote from said shutter having two spaced projections, a cam formation, and a slip mounting for said formation upon said shaft, said lever after an exposing operation and said cam formation then being so disposed that revolution of said shaft brings said cam formation against a first of said projections thereby operating said lever in a direction opposite to said given direction to reset said mechanism and to move said first projection so that said cam formation clears said first projection, continued revolution of said shaft then bringing said cam formation against said second projection, further revolution of said take-up shaft being without effect upon said lever because of said slip mounting.

17. In a camera having a casing, revoluble means including a shaft for taking up a film, a lens for directing light upon the film before it is taken up, an operable shutter for said lens, resettable mechanism for operating said shutter, said operating mechanism including a pivoted lever, a control button external to said casing, a connection between said button and said lever for moving said lever in a given direction upon the operation of said button, a connection between said lever and said shutter for operating said shutter upon such movement of said lever, an end of said lever relatively remote from said shutter having two spaced projections, a cam formation, a slip mounting for said formation upon said shaft, a member external to said casing for revolving said shaft, said lever after an exposing operation and said cam formation being so disposed that revolution of said shaft brings said cam formation against a first of said projections thereby operating said lever to reset said mechanism and to move said control button back to operating position and to move said first projection so that said cam formation clears said first projection, continued revolution of said shaft then bringing said cam formation against said second projection, further revolution of said take-up button being without effect upon said lever because of said slip mounting, and a control member exterior to said casing operatively connected to said lever for moving it to release said shutter, such movement of said control button being effective to move said second formation away from holding relation to said cam ready for another taking up cycle.

18. In a camera, revoluble means including a shaft for taking up a film, a lens for directing light upon the film before it is taken up, an alternatively revoluble and resettable shutter for said lens, means for operating said shutter, said operating means including a pivoted lever, a control button engageable with said lever for moving said lever in a given direction, motion transmitting connections between said lever and said shutter-operating means for operating said shutter upon its movement in said given direction, one end of said lever relatively remote from said shutter being bifurcated, said lever and said take-up shaft being so mounted that said shaft is disposed within said bifurcation, a cam formation upon said shaft, and means for mounting said formation upon said shaft of said taking-up means within said bifurcation for revolution therewith so that upon its revolution by said shaft as said taking up means is being operated it engages a leg of said bifurcation and thereby moves said lever in a direction opposite to said given direction thereby resetting said shutter.

19. In a camera, revoluble means including a shaft for taking up a film, a lens for directing light upon the film before it is taken up, an operable shutter for said lens, a pivoted lever, motion transmitting connections between said lever and said shutter for alternatively operating and resetting said shutter upon movement of said lever, one end of said lever relatively remote from said shutter being bifurcated, a first tooth being disposed upon a first of the legs of said bifurcation, said lever and said take-up shaft being so mounted that said shaft is disposed within said bifurcation, a cam formation including a second tooth, means for frictionally mounting said cam formation upon said shaft of said taking up means within said bifurcation for movement therewith and independently in relation thereto so that upon its revolution by said shaft as said taking up means is being operated it engages a second leg of said bifurcation and thereby moves said lever thereby resetting said shutter, said mounting of said cam formation being such that continued revolution of said shaft thereafter brings said first tooth into holding contact with said second tooth, still further revolution of said shaft being free because of the frictional mounting of said cam formation upon said shaft which causes said formation to slip, and means for moving said lever to operate said shutter and thereby move said first tooth out of holding contact with said second tooth.

20. Apparatus according to claim 19, said apparatus including a shutter-release button operatively connected to said lever for moving it for releasing said shutter, such movement thereby separating said teeth ready for another cycle of taking up operation.

21. In a camera, revoluble means including a shaft for taking up a film, a lens for directing light upon the film before it is taken up, an operable shutter for said lens, operating means connected to said shutter which when moved in one or a first direction operates said shutter and when moved in an opposite or second direction resets said shutter ready for another cycle of operation, a control button having a portion accessible from the outside of the camera and movable from said first to another or a second position, movable linkage operatively interconnected with said operating means and engageable by said control button and effective upon the movement of said control button from said first to said second position to move said shutter operating means in said first direction thereby operating said shutter to make an exposure, said linkage including a motion-receiving member disposed adjacent said shaft of said taking up means, a motion-transmitting formation upon said shaft which upon the revolution of said shaft engages and moves said motion-receiving member thereby operating said linkage to move said shutter operating means in said second direction to reset said shutter and to move said control button from said second position back to said first position.

22. In a camera having a casing, revoluble means for taking up a film, said means including a revoluble shaft within said casing and a revoluble take-up button without said casing, an operable shutter for exposing the film, mechanism connected to said shutter and having a member movable from one or a first position for operating said mechanism to cause said shutter to expose the film to another or second position to operate said mechanism to reset said shutter, an exposure control button, said button having an operable portion accessible from the exterior of said casing and another portion interior to said casing engaging said member of said shutter control mechanism, said control button being movable between a first or operable location and a second or operated or disabled location, manual movement of said button from said first to said second location transmitting movement to said member to move it from said first to said second position thereby operating said shutter and at the same time rendering said exposure control button inoperable whereby a user cannot interfere with the operation of the camera, and a connection between said take-up shaft and said mechanism for moving said mechanism from said second position back to said first position upon the revolution of said take-up shaft thereby resetting said shutter, such last mentioned movement by engagement between said member and said exposure control button also moving said exposure control button to its first or operable location ready for the actuation of another cycle.

References Cited in the file of this patent

UNITED STATES PATENTS

| 2,036,326 | Frost | Apr. 7, 1936 |

FOREIGN PATENTS

| 246,011 | Switzerland | Aug. 16, 1947 |